United States Patent
Harada et al.

(10) Patent No.: US 7,999,786 B2
(45) Date of Patent: Aug. 16, 2011

(54) ELECTROPHORETIC DISPLAY AND METHOD OF MANUFACTURING THE SAME

(75) Inventors: Mitsuaki Harada, Chino (JP); Takeo Kawase, Suwa (JP); Soichi Moriya, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1105 days.

(21) Appl. No.: 11/030,108

(22) Filed: Jan. 7, 2005

(65) Prior Publication Data
US 2005/0162379 A1    Jul. 28, 2005

(30) Foreign Application Priority Data
Jan. 13, 2004  (JP) ................. 2004-005410

(51) Int. Cl.
*G09G 3/34*   (2006.01)
(52) U.S. Cl. ...................... 345/107; 359/296
(58) Field of Classification Search .......... 345/107; 359/296
See application file for complete search history.

(56) References Cited

U.S. PATENT DOCUMENTS

| | | | |
|---|---|---|---|
| 5,557,295 A * | 9/1996 | Miyashita et al. | 345/36 |
| 6,661,563 B2* | 12/2003 | Hayashi et al. | 359/296 |
| 6,671,081 B2* | 12/2003 | Kawai | 359/296 |
| 6,690,361 B1* | 2/2004 | Kang et al. | 345/173 |
| 6,771,327 B2* | 8/2004 | Sekiguchi | 349/12 |
| 6,791,535 B2* | 9/2004 | Suzuki | 345/173 |
| 2002/0105600 A1* | 8/2002 | Shimoda et al. | 348/739 |
| 2003/0234398 A1* | 12/2003 | Aoki et al. | 257/72 |

FOREIGN PATENT DOCUMENTS

| | | |
|---|---|---|
| JP | A-04-310926 | 11/1992 |
| JP | 08095023 A * | 4/1996 |
| JP | A-2001-125512 | 5/2001 |
| JP | A 2003-295234 | 10/2003 |
| JP | A 2003-295235 | 10/2003 |
| WO | WO 00/54101 | 9/2000 |

\* cited by examiner

*Primary Examiner* — Nitin Patel
(74) *Attorney, Agent, or Firm* — Oliff & Berridge, PLC

(57) ABSTRACT

To reduce or prevent metal wirings formed on one substrate and electrodes formed on the other substrate from being shorted. An electrophoretic display in which, a display part including electrophoretic particles electrophoresed by application of an electric field, and an electrophoretic display part including an electrode to apply the electric field to the display part, are bonded to a substrate. The substrate includes a metal wiring including an insulating part disposed at a position that corresponds to at least a part of an edge of the electrode.

21 Claims, 18 Drawing Sheets

ELECTROPHORETIC DISPLAY AND METHOD OF MANUFACTURING THE SAME

BACKGROUND

Exemplary embodiments relate to an electrophoretic display and a method of manufacturing the same.

In the related art, reflective displays that are viewable under a surrounding natural brightness can offer usability close to that of printed matters. Electrophoretic displays, which do not need polarizers and have a high efficiency with the use of light, can be used as such reflective displays.

In electrophoretic displays, for example, a pair of substrates, at least one of which is a transparent substrate, is disposed facing each other. A dispersion liquid including particles (electrophoretic particles) that are electrophoresed by application of electric field is disposed between these substrates.

Examples of the electrophoretic displays are disclosed in Japanese Unexamined Patent Publications No. 2003-295234 and No. 2003-295235, for example. In these techniques, microcapsules filled with a dispersion liquid, that includes white-colored particles positively charged and particles that are colored in a different color and are negatively charged, are disposed between substrates having electrodes. Then, the color viewed from the viewing side (transparent substrate side) is changed by varying the polarity of one or the other electrode. Specifically, when a negative voltage is applied to the electrode on the viewing side, the positively charged particles (white particles) are electrophoresed toward the transparent substrate side by means of the Coulomb force so as to attach to the electrode of the viewing side. When the display in this state is viewed from the transparent substrate side, a part in which the particles have been attached to and a layer that has been formed looks white. In contrast, when the polarity of an applied voltage is reversed, the particles positively charged (particles colored in a different color) attach to the electrode on the viewing side so as to form a layer, so that the display shows the color.

In addition, in another related art electrophoretic display, a non-transparent substrate is colored in a color different from that of particles. Then, a voltage having the polarity opposite to that of the particles is applied to an electrode between substrates, whereby the particles are attached to the electrode. Thus, the color of the non-transparent substrate is displayed. In contrast, a voltage is not applied to the electrode so that the particles are deposited on the non-transparent substrate, and thus displaying the color of the particles.

In still another related electrophoretic display, a dispersion liquid including particles is filled into microcapsules colored in a different color from that of the particles. Then, a voltage having the polarity opposite of that of the particles is applied to an electrode disposed on a transparent substrate, whereby the particles are attached to the electrode on the transparent substrate. Thus, the color of the particles is displayed. In contrast, a voltage having the polarity opposite to that of the particles is applied to an electrode disposed on a non-transparent substrate so that the particles are attached to the electrode on the non-transparent substrate, and thus displaying the color of the microcapsule.

Related art devices are disclosed in Japanese Unexamined Patent Publication No. 2003-295234, Japanese Unexamined Patent Publication No. 2003-295235, and WIPO Patent Publication No. WO00-54101.

SUMMARY

When the above-described electrophoretic displays are manufactured, for example, as disclosed in Japanese Patent No. 54101, a display is firstly disposed on one substrate. Then, the other substrate and one substrate are bonded so as to dispose the display between the substrates. Generally, one substrate includes switching elements or the like to drive the display and metal wirings. The other substrate includes a common electrode. Because of this, in the related art electrophoretic displays, the common electrode formed on the other substrate may contact the metal wirings, or the like, formed on one substrate to be shorted. In addition, the devices of the related art include organic transistors in a part of switching elements as the electrophoretic display to improve the flexibility. However, the above-described display includes organic solvents or the like. Thus, in the electrophoretic display including such organic transistors, a problem arises in which the organic transistors are deteriorated by the organic solvents or the like.

Taking the above-described problems into account, a first exemplary embodiment discourages or prevents metal wirings formed on one substrate and electrodes formed on the other substrate from being shorted. A second exemplary embodiment suppresses or reduces deterioration of the organic transistors.

Thus, according to a first exemplary embodiment, an electrophoretic display has a display part including electrophoretic particles electrophoresed by application of an electric field, and an electrophoretic display part including an electrode to apply the electric field to the display part are bonded to a substrate including a metal wiring that includes an insulating part disposed at a position that corresponds at least to a part of an edge of the electrode.

In the first exemplary embodiment, the insulating part is disposed at the position that corresponds to at least a part of the edge of the electrode. Thus, when the electrophoretic display part is bonded to the substrate, the electrode included in the electrophoretic display part and the metal wiring included in the substrate can be insulated with the insulating part. Consequently, the electrophoretic display of the first aspect of the invention can reduce or prevent the metal wiring formed on the substrate (one substrate) and the electrode formed on the electrophoretic display part (the other substrate) from being shorted.

In the electrophoretic display, the configuration may be employed in which the insulating part is disposed at the position that corresponds to the metal wiring or the entire periphery of the electrode. For example, in the case where the insulating part is disposed at the position that corresponds to the metal wiring of the substrate, the insulating part can be lessened because the insulating part is disposed only at the position that corresponds the metal wiring. In contrast, where the insulating part is disposed at the position that corresponds to the entire periphery, the electrophoretic display part can readily be kept horizontal against the substrate because the insulating part can be disposed at a constant height over the entire periphery of the electrode.

In addition, in the electrophoretic display, an adhesive tape can be used as the insulating part. By using such adhesive tape as the insulating part, the insulating part can readily be attached to the substrate or the edge of the electrode.

Further, in the electrophoretic display, a tape can be used where both sides of the tape have adhesive. In this way, using the tape with both sides having adhesive, a supporting part to support the adhesive part is not required. This makes it possible to reduce the thickness of the insulating part, thereby enabling the electrophoretic display to be thinner.

Also, in the electrophoretic display, the configuration in which the insulating film is made of a high-molecular-weight film having a thickness from about 3 μm μmto about 150 μm can be employed.

According to the second exemplary embodiment, an electrophoretic display has a display part including electrophoretic particles electrophoresed by application of an electric field and an electrophoretic display part including an electrode to apply the electric field to the display part bonded to a substrate including an organic transistor including an insulative protection film between the electrophoretic display part and the substrate to reduce or suppress deterioration of the organic transistor.

The electrophoretic display of the second exemplary embodiment includes the protection film between the electrophoretic display part and the substrate to reduce or suppress deterioration of the organic transistor. Thus, for example, the protection film can restrain or prevent substances such as organic solvent, or the like, contained in the electrophoretic display part, from penetrating to the organic transistor side, thereby enabling deterioration of the organic transistor to be suppressed, reduced, minimized or eliminated.

Also, in the electrophoretic display, the protection film that is film like can be used. It is preferable that the thickness of the film is from about 3 μm to about 50 μm. As discussed above, the protection film is disposed between the electrophoretic display part and the substrate. Therefore, for example, if the configuration is employed in which the display part is sandwiched by the electrode formed to the electrophoretic display part and the electrode formed to the substrate, the protection film may suppress applying an electric field to the display part. Consequently, as in the electrophoretic display, the protection film having a thickness of from about 3 μm to about 50 μm can restrain or prevent the application of the electric field to the display part from being reduced or suppressed.

In addition, in the electrophoretic display of the second exemplary embodiment, the configuration may be employed in which the protection film is made of a high-molecular-weight film. In this way, in the case where the protection film is made of high-molecular-weight films, these resins can be disposed by a droplet discharge method. This makes it possible to readily form the protection film.

In the electrophoretic display of the second exemplary embodiment, the protection film is disposed wider than the projected region of the electrophoretic display part if the electrophoretic display part is projected to the substrate. Since the protection film is disposed wider than the projected region of the electrophoretic display part if the electrophoretic display part is projected to the substrate, the electrode of the electrophoretic display part and the metal wiring of the substrate can be prevented from being touched in the case when the electrophoretic display part and the substrate are bonded to each other. As mentioned above, the insulating film has an insulative property. Thus, the insulating film can reduce or prevent the electrode of the electrophoretic display part and the metal wiring of the substrate from being shorted.

In a third exemplary embodiment, a method of manufacturing an electrophoretic display, in which a display part including electrophoretic particles electrophoresed by application of an electric field and an electrophoretic display part including an electrode to apply the electric field to the display part are bonded to a substrate including a metal wiring, includes disposing an insulating part at a position that corresponds at least a part of an edge of the electrode.

The electrophoretic display in which the insulating part is disposed at the position that corresponds to at least a part of the edge of the electrode can be manufactured by the method of manufacturing an electrophoretic display of the third exemplary embodiment.

In addition, in the method of manufacturing an electrophoretic display according to the third exemplary embodiment, the insulating part is disposed to the substrate side and then the electrophoretic display part and the substrate are bonded to each other. In this way, the insulating part can readily be disposed at a substantially planar region of the substrate.

In the method of manufacturing an electrophoretic display, the insulating part can be disposed by means of a droplet discharge method. In this way, the insulating part can readily be disposed to a predetermined region by means of a droplet discharge method.

In a fourth exemplary embodiment, a method of manufacturing an electrophoretic display, in which a display part including electrophoretic particles electrophoresed by application of an electric field and an electrophoretic display part including an electrode for applying the electric field to the display part are bonded to a substrate including an organic transistor, includes disposing an insulative protection film between the electrophoretic display part and the substrate to suppress deterioration of the organic transistor.

The electrophoretic display including the protection film between the electrophoretic display part and the substrate to reduce or suppress deterioration of the organic transistor can be manufactured by the method of manufacturing an electrophoretic display according to the fourth exemplary embodiment.

In addition, in the method of manufacturing an electrophoretic display, the protection film may be disposed to the substrate side and then the electrophoretic display part and the substrate are bonded to each other. For example, in the case where the protection film is disposed over the whole pixel region in which organic transistors are formed, it is conceivable that the protection film is formed in thin film like to be disposed over the whole pixel region. Since such a protection film that is like a thin film is easily broken, careful handling is required. Consequently, as in the electrophoretic display, the protection film can be disposed to the substantially planar region of the substrate by bonding the electrophoretic display part and the substrate after disposing the protection film to the substrate side. As a result, the protection film can readily be disposed.

According to the fourth exemplary embodiment, in the method of manufacturing an electrophoretic display, the protection film can be disposed by a droplet discharge method. In this way, the protection film can readily be disposed to a predetermined region by means of a droplet discharge method.

DETAILED DESCRIPTION OF EMBODIMENTS

Figure 1:
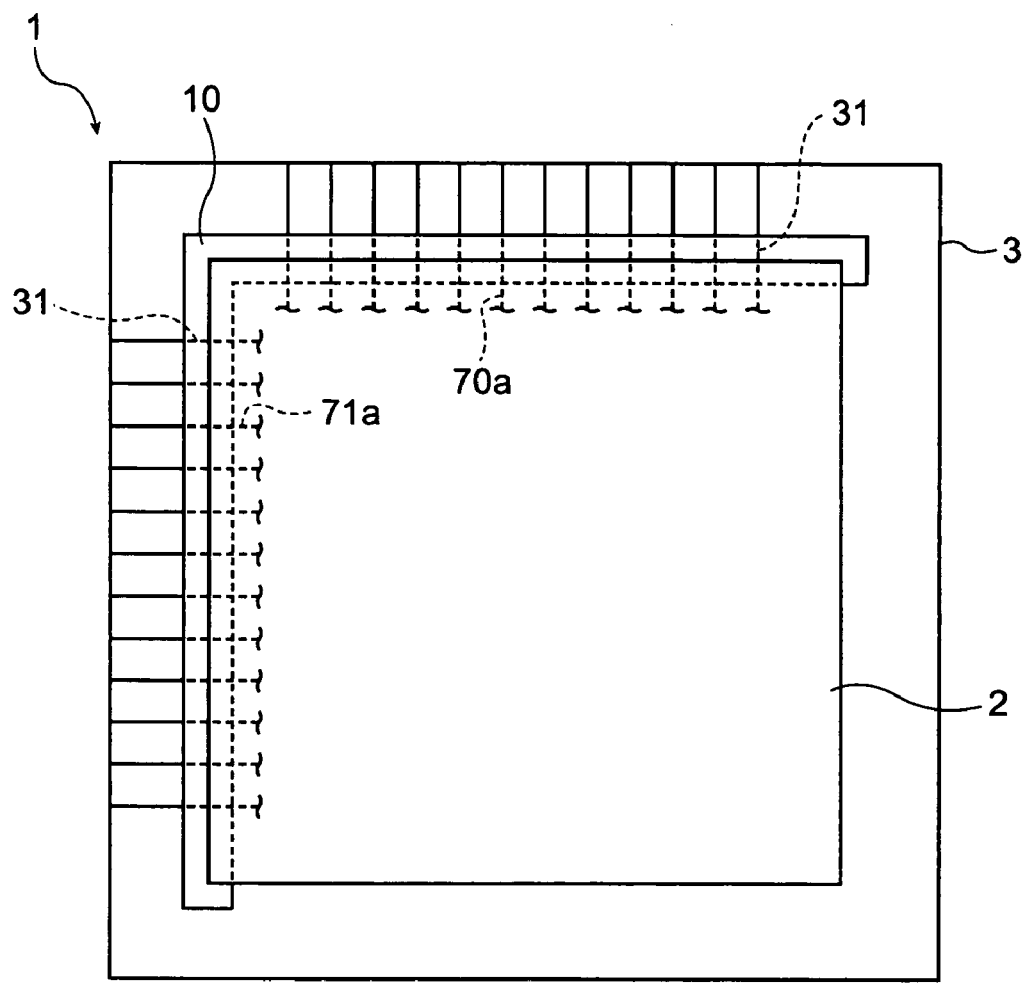
FIG. 1 is a plan schematic showing an electrophoretic display in a first exemplary embodiment of the present invention.

An exemplary embodiment of an electrophoretic display and a method of manufacturing the same will be described below with reference to the drawings. In the drawings, the scale of members is adequately changed in order to illustrate the members in recognizable size.

First Exemplary Embodiment

Figure 2:
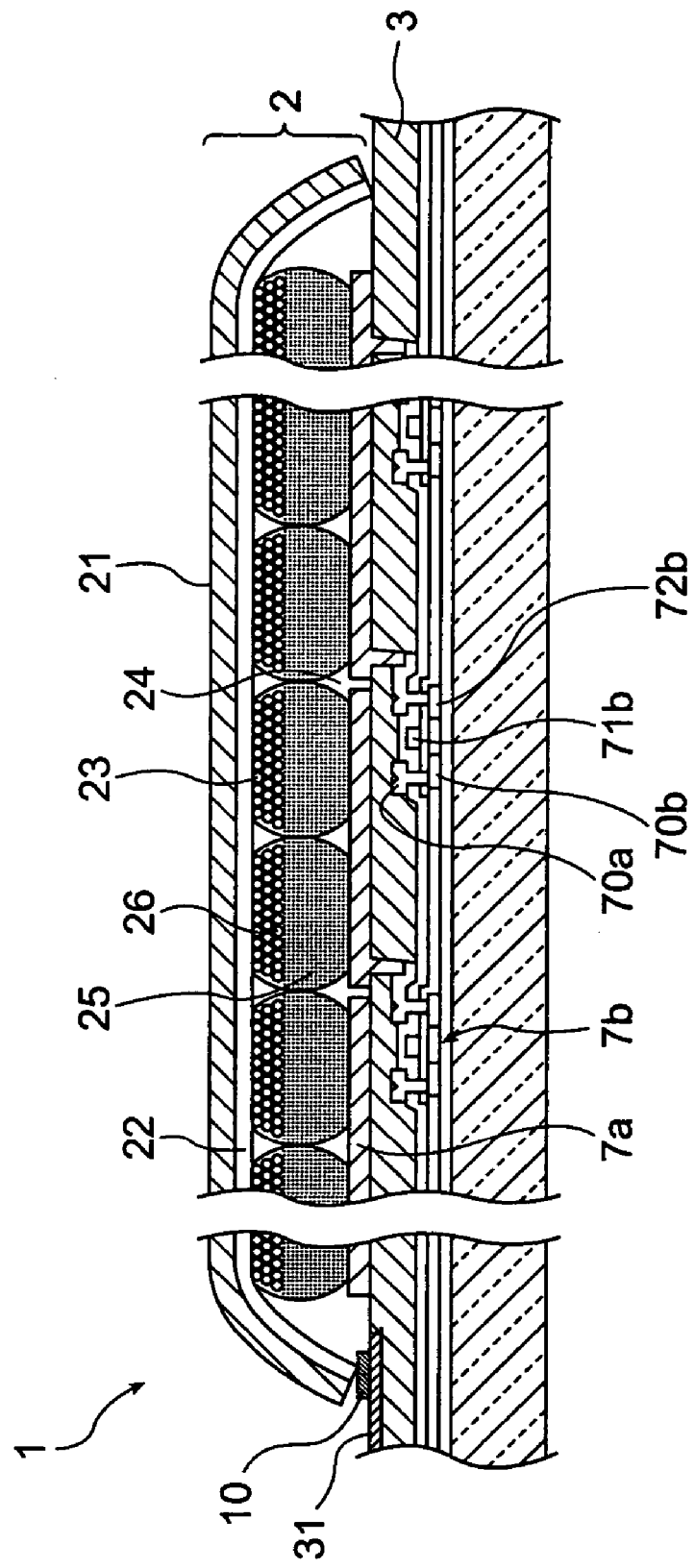
FIG. 2 is a sectional view schematic showing an electrophoretic display in the first exemplary embodiment of the present invention.

FIG. 1 is a plan view schematic of an electrophoretic display 1 in a first exemplary embodiment. FIG. 2 is a sectional view schematic of the electrophoretic display 1. As shown in FIG. 1 and FIG. 2, the electrophoretic display 1 of the first exemplary embodiment has the configuration in which an electrophoretic sheet 2 (electrophoretic display part) and a substrate 3 including a metal wiring 3 are bonded to each other.

The electrophoretic sheet 2, as shown in FIG. 2, may be configured with a transparent substrate 21, a common electrode 22 (electrode) and a display part 23. The transparent substrate 21 is a substrate such as, for example, transparency film or the like having an optical transparency. The common electrode 22 may be disposed inside the transparent substrate 21 (display part 23 side). The common electrode 22 may be formed with a conductive material having the optical transparency, for example, indium tin oxide (ITO).

As shown in FIG. 2, the display part 23 includes a microcapsule 24, a dispersion liquid 25 filled into the microcapsule 24, and white particles 26 (electrophoretic particles) dispersed into the dispersion liquid 25. The microcapsule 24 may have a particle diameter of approximately 50 μm. The white particles are positively charged.

The microcapsule 24 may be composed of acrylic resin such as poly methyl methacrylate and poly ethyl methacrylate, urea resin and high-molecular-weight resin such as gum arabic.

The dispersion liquid 25 may include a single material or a mixture of the following materials to which a surfactant is added can be used, for example: water; alcohol solvents such as methanol, ethanol, isopropanol, butanol, octanol and methyl cellosolve; esters such as ethyl acetate and butyl acetate; ketones such as acetone, methyl ethyl ketone and methyl isobutyl ketone; aliphatic hydrocarbons such as pentane, hexane and octane; alicyclic hydrocarbons such as cyclohexane and methylcyclohexane; aromatic hydrocarbons having long-chain alkyl groups such as benzene, toluene, xylene, hexylbenzene, heptylbenzene, octylbenzene, nonylbenzene, decylbenzene, undecylbenzene, dodecylbenzene, tridecylbenzene and tetradecylbenzen; halogenated hydrocarbons such as methylene chloride, chloroform, carbon tetrachloride and 1,2-dichloroethane; carboxylates; or other various oils.

The white particles 26 are organic or inorganic particles (high molecule or colloid) having the characteristics of moving by electrophoresis due to a potential difference in the dispersion liquid 25. The white particles 26 may include, for example, white pigments such like titanium dioxide, zinc oxide, antimony trioxide and the like can be used.

The substrate 3 need not have an optical transparency. In the first exemplary embodiment, the substrate having flexibility, like resin film substrate, or the like, is exemplified. A plurality of scanning lines 71a (metal wiring) and a plurality of data lines 70a (metal wiring) are formed on the substrate 3 along the row direction and column direction, respectively, in a manner to be isolated from each other. Pixel electrodes 7a and TFT elements (switching elements) 7b to control a current to the pixel electrodes 7a may be formed in pixel regions separated in a matrix by the scanning lines 71a and the data lines 70a. A display region is constituted by the plurality of pixel regions arranged in a matrix. The TFT element 7b may be configured with an organic transistor, thereby enabling the flexibility of the substrate 3 to be improved. The organic transistor refers to the transistor in which organic materials may be used as semiconductor layers.

Each of the data lines 70a may be electrically connected to a source 70b of the TFT element 7b. Image signals may be supplied to each of the data lines 70a line-sequentially, or are supplied to each group of the plural data lines 70a adjacent to each other. Meanwhile, the scanning line 71a may be electrically connected to a gate 71b of the TFT element 7b, and scanning signals may be pulsatively supplied at a predetermined timing to the plurality of scanning lines 71a line-sequentially. The pixel electrode 7a may be electrically connected to a drain 72b of the TFT element 7b. A pulse voltage may be applied to the gate 71*b* to switch the TFT element 7*b* on for a certain period, whereby image signals supplied from the data line 70*a* may be written in the pixel electrode 7*a* at a predetermined timing. This permits display in each pixel region. The data lines 70*a* and the scanning lines 71*a* may be connected to drivers (not shown) with leads 31 (metal wiring) formed and extended to the edge part of the substrate 3.

In the electrophoretic display 1 of the first exemplary embodiment, as shown in FIG. 1 and FIG. 2, insulating tape 10 may be disposed on the leads 31 that corresponds to at least a part of the edge of the common electrode 22. Therefore, the common electrode 22 and the leads 31 are reliably insulated with the insulating tape 10. This makes it possible to reduce or prevent the common electrode 22 and the leads 31 from being shorted. As the insulating tape 10, polyimide adhesive tape or vinyl adhesive tape may be used. Meanwhile, the single side adhesive tape may cause the required thickness of the insulating tape 10 to be thicker due to its support part supporting the adhesive part. Thus, it is preferable that two-sided tape is used as the insulating tape 10. This enables the electrophoretic display 1 to be thinner.

In the electrophoretic display 1 of the first exemplary embodiment configured as described above, by supplying the scanning signals through the scanning lines 71*a* and image signals through the data lines 70*a* from drivers, a voltage may be applied to the pixel electrode 7*a*, whereby an electric field is applied to the display part 3. In the electrophoretic display 1 of the first exemplary embodiment, since the insulating tape 10 is disposed on the leads 31, scanning signals and image signals may be reliably supplied to the TFT element 7*b* without shorting between the common electrode 22 and the leads 31.

Thus, when an electric field is applied to the display part 3, for example, in the case where the pixel electrode 7*a* shows positive polarity, the white particles 26 are attracted toward the pixel electrode 7*a* side by means of the Coulomb force. As a result, the display part 3 may display black color. In contrast, if the pixel electrode 7*a* shows negative polarity, the white particles 26 are attracted toward the common electrode 22 side, the electrode 22 showing positive polarity, by means of the Coulomb force. As a result, the display part 3 may display white color.

Figure 3A:
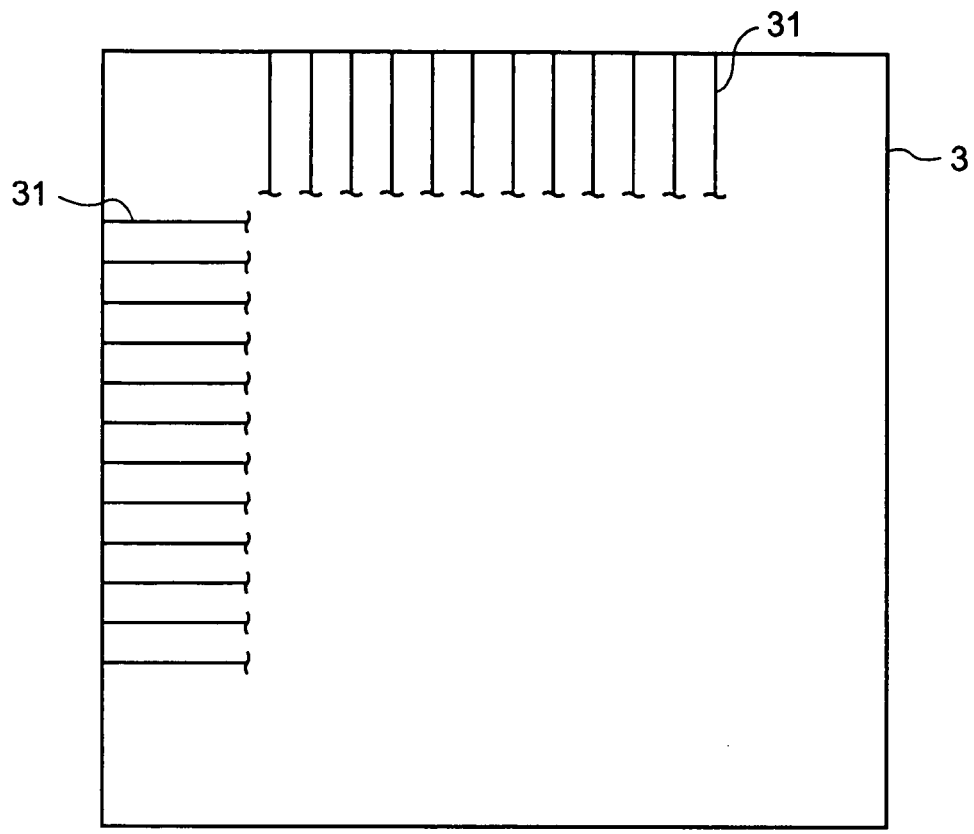
FIGS. 3A-3B are schematics showing a method of manufacturing the electrophoretic display in the first exemplary embodiment of the present invention.
Figure 3B:
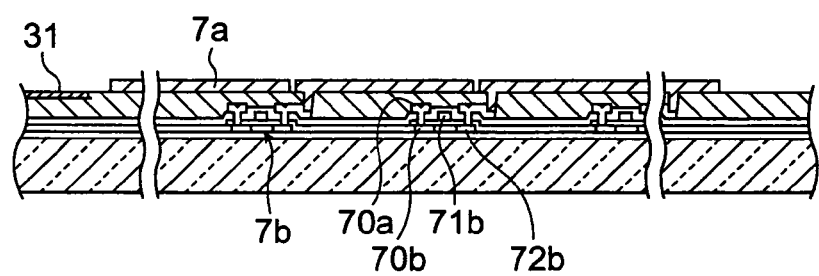

A method of manufacturing the electrophoretic display 1 of the first exemplary embodiment will be described referring to FIGS. 3A-5. In FIGS. 3A-4B, FIG. 3A is a plan view and FIG. 3B is a sectional view. First, as shown in FIGS. 3A and 3B, the substrate 3 may be prepared such that the pixel electrode 7*a*, the TFT element 7*b*, the data lines 70*a*, the scanning lines 71*a* and the leads 31 are formed.

Figure 4A:
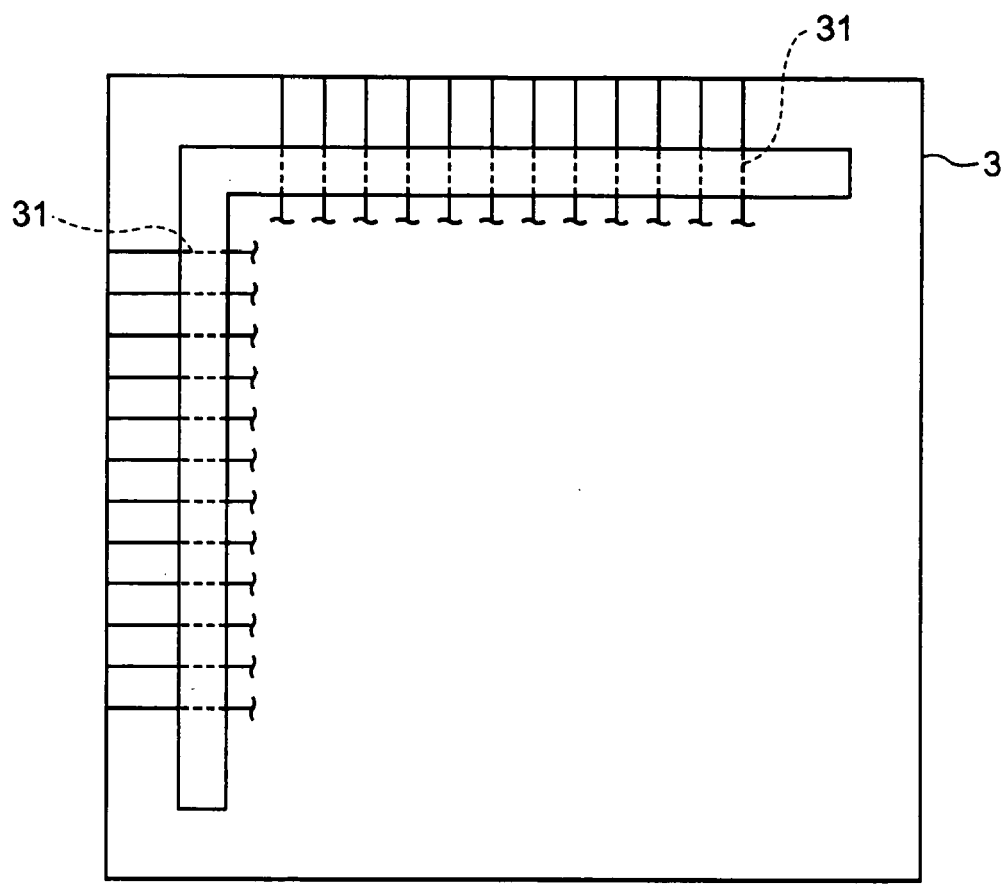
FIGS. 4A-4B are schematics showing a method of manufacturing the electrophoretic display in the first exemplary embodiment of the invention.
Figure 4B:
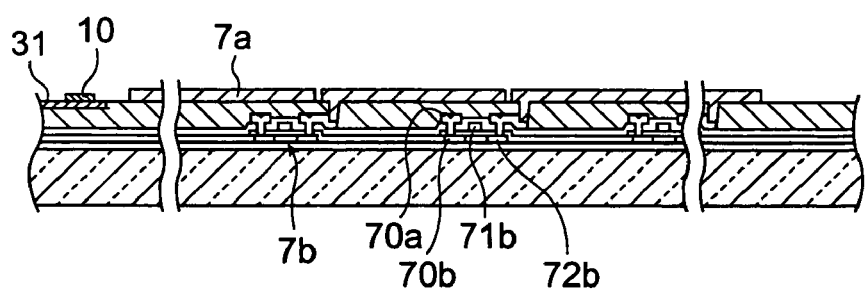

Then, as shown in FIG. 4A and FIG. 4B, the insulating tape 10 may be attached on the leads 31 that correspond to a part of the edge of the common electrode 22 on the substrate 3. In this case, the insulating tape 10 can readily be attached because it is attached on a substantially planar region of the substrate 3.

Figure 5:
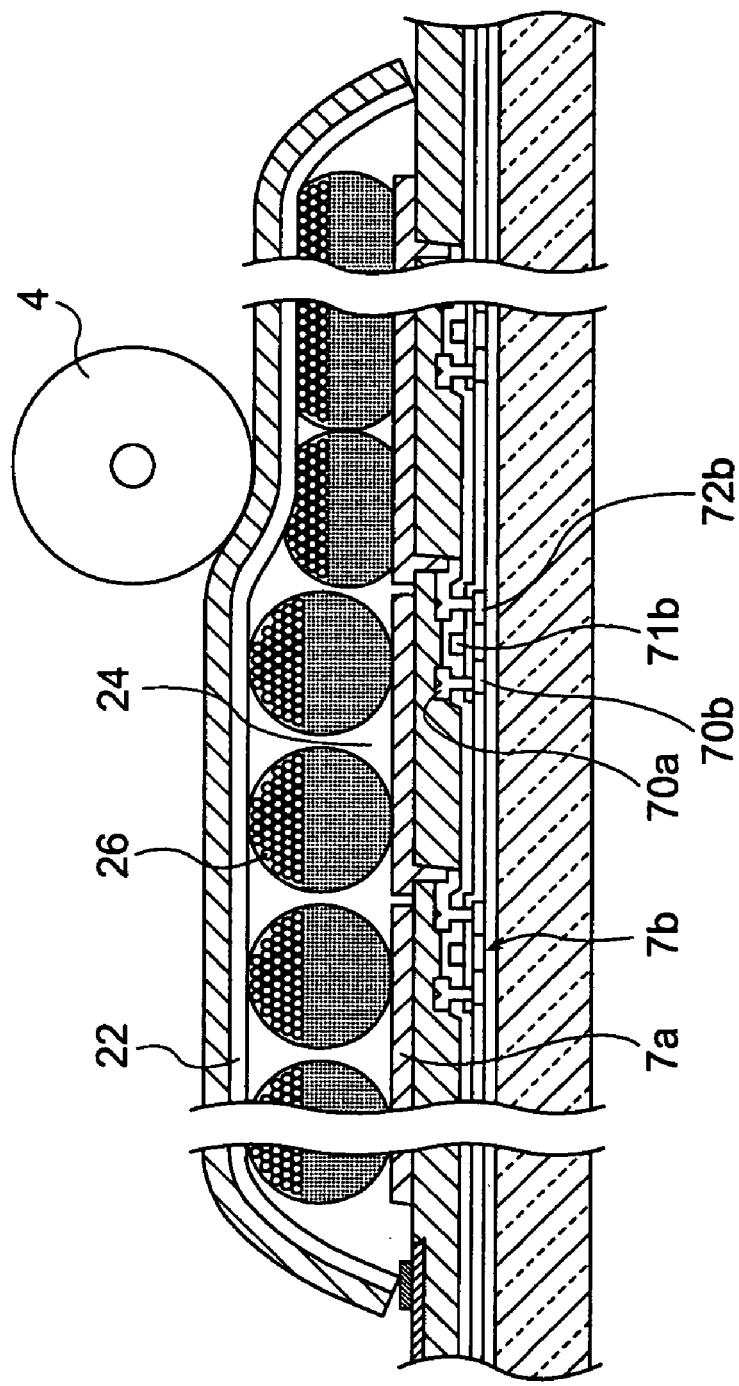
FIG. 5 is a schematic showing the method of manufacturing the electrophoretic display in the first exemplary embodiment of the present invention.

Then, as shown in FIG. 5, an electrophoretic sheet 2 is disposed on the substrate 3 with an adhesive. Subsequently, the substrate 3 and the electrophoretic display part 2 are bonded by pressure bonding the electrophoretic sheet 2 to the substrate 3 with a roller 4. Since the insulating tape 10 is disposed on the leads 31 on the substrate 3, the edge part of the common electrode 22 of the electrophoretic sheet 2 is prevented from being touched to the leads 31. Therefore, the electrophoretic display 1 in which the common electrode 22 and the leads 31 are prevented from being shorted can be manufactured by the method of manufacturing an electrophoretic display of the first exemplary embodiment.

Second Exemplary Embodiment

Next, an electrophoretic display 100 of a second exemplary embodiment will be described referring to FIG. 6 and FIG. 7. In the description of the present second exemplary embodiment, the description of the same parts as those in the first exemplary embodiment will be omitted or simplified.

Figure 6:
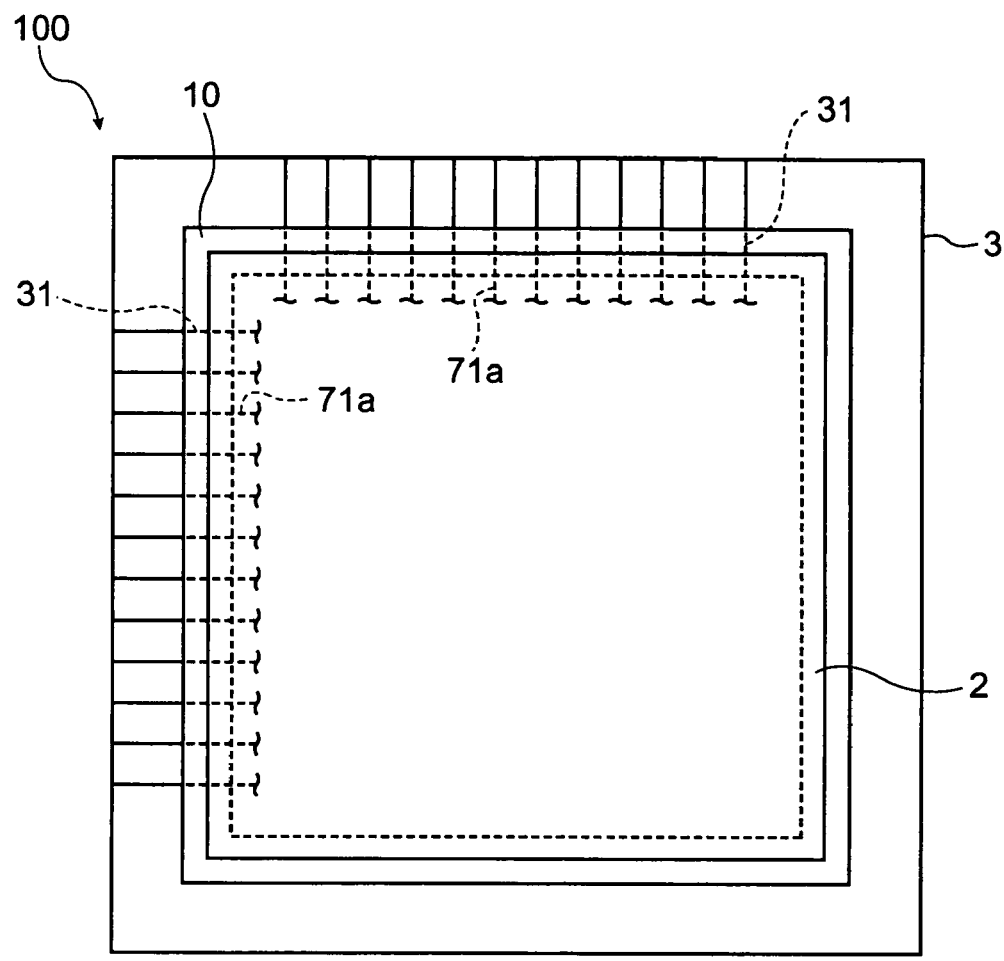
FIG. 6 is a plan schematic showing an electrophoretic display in a second exemplary embodiment of the present invention.
Figure 7:
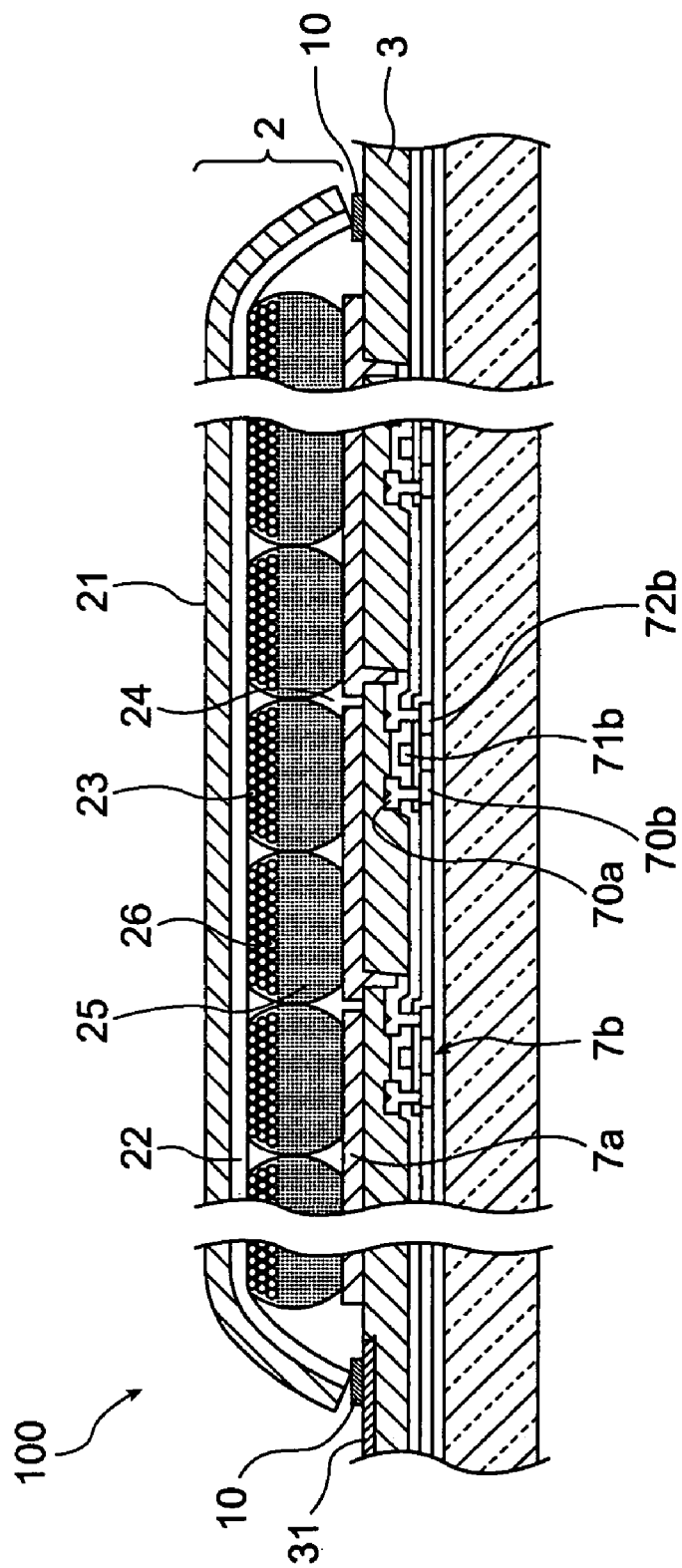
FIG. 7 is a sectional schematic showing the electrophoretic display in the second exemplary embodiment of the present invention.

FIG. 6 is a plan view schematic of the electrophoretic display 100 of the second exemplary embodiment. FIG. 7 is a sectional view schematic of the electrophoretic display 100. As shown in these figures, the insulating tape 10 is disposed at a position that corresponds to the entire periphery of the common electrode 22 in the electrophoretic display 100 of the second exemplary embodiment. By disposing the insulating tape 10 at the position that corresponds to the entire periphery of the common electrode 22, the common electrode 22 and the leads 31 can be prevented from being shorted. Simultaneously, the electrophoretic display part 2 can readily be kept substantially horizontal against the substrate 3 because the height of the position that corresponds to the entire periphery of the common electrode 22 becomes the constant.

Third Exemplary Embodiment

Next, an electrophoretic display 200 of a third exemplary embodiment and a method of manufacturing the same will be described referring to FIGS. 8 through 10. In the description of the third exemplary embodiment, the description of the same parts as those in the first exemplary embodiment will be omitted or simplified.

Figure 8:
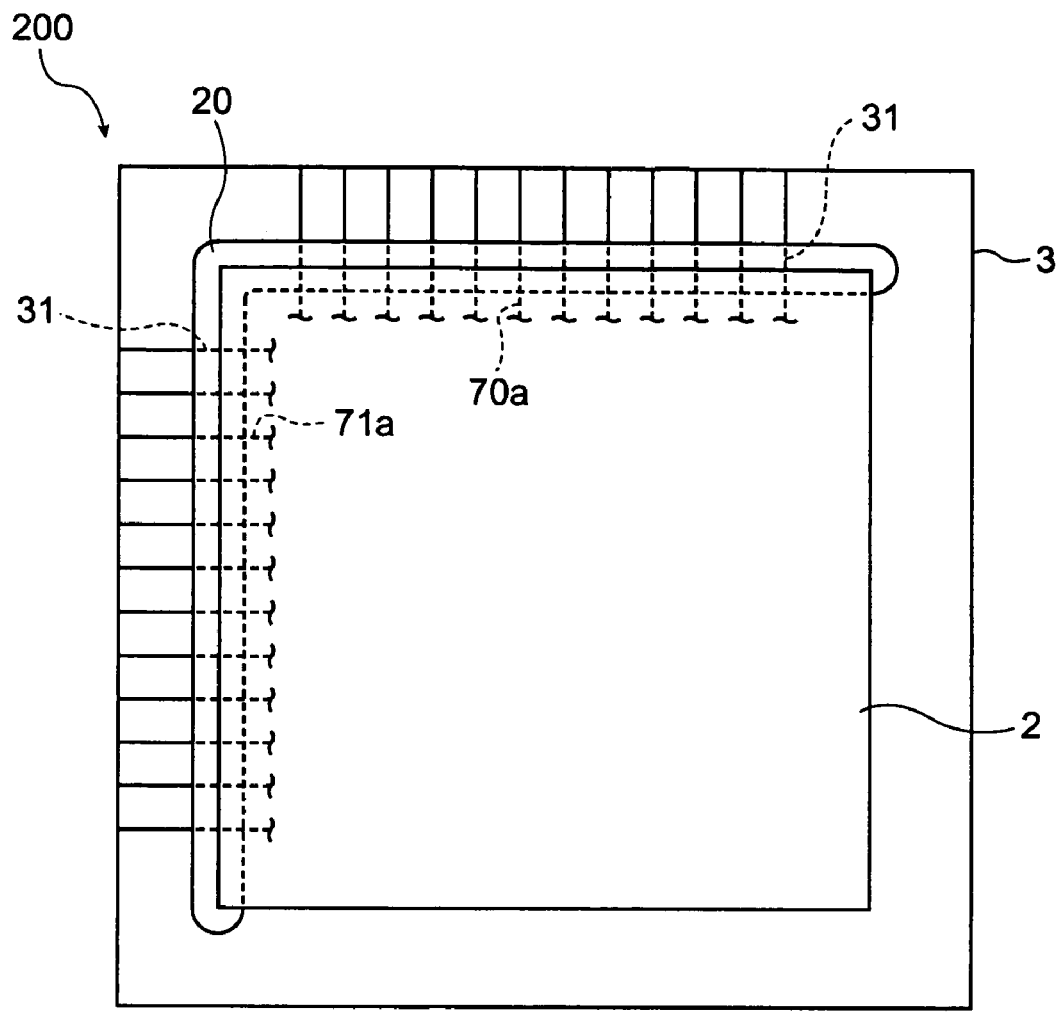
FIG. 8 is a plan schematic showing an electrophoretic display in a third exemplary embodiment of the present invention.
Figure 9:
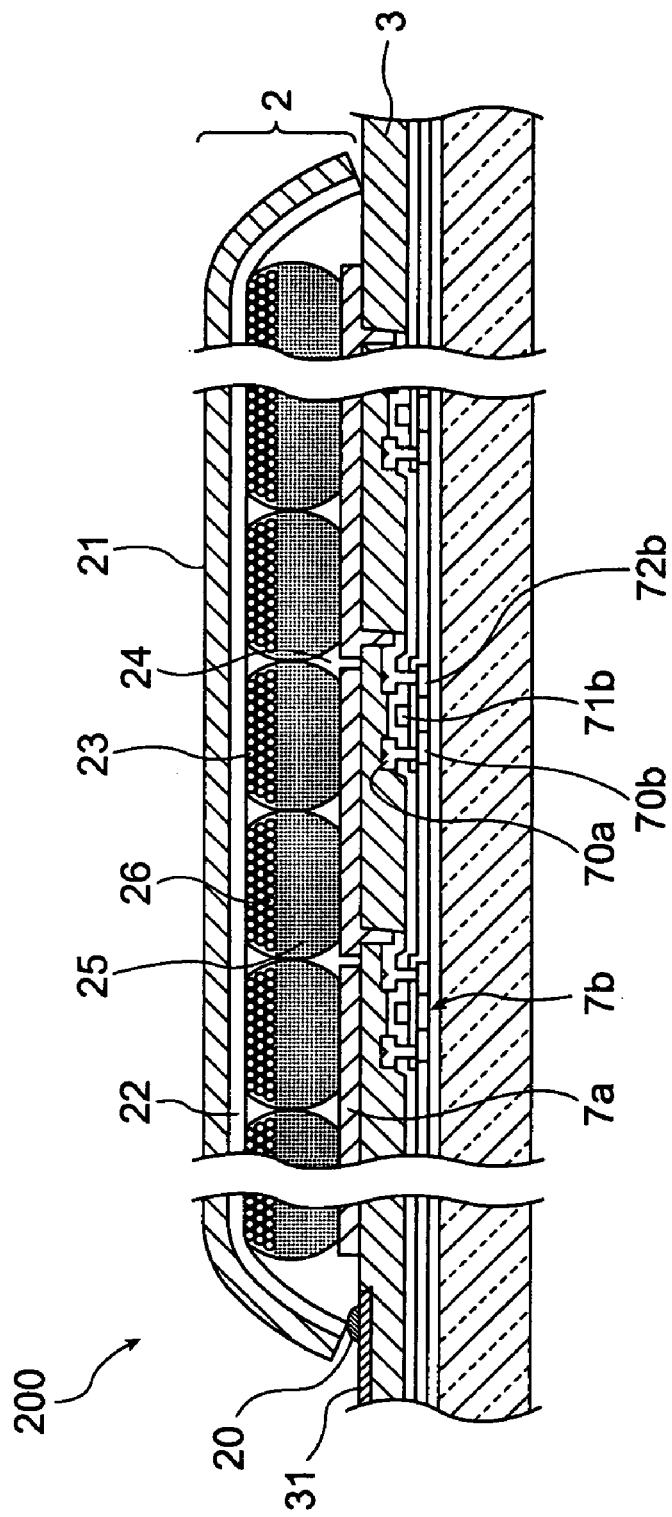
FIG. 9 is a sectional schematic showing the electrophoretic display in the third exemplary embodiment of the present invention.

FIG. 8 is a plan view schematic of the electrophoretic display 200 of the third exemplary embodiment. FIG. 9 is a sectional view schematic of the electrophoretic display 200. As shown in these figures, in the electrophoretic display 200 of the third exemplary embodiment, an insulating material 20 that is a high-molecular-weight film having a thickness of about 3 µm to about 150 µm is disposed instead of the insulating tape 10, as described above in the exemplary embodiments.

Figure 10:
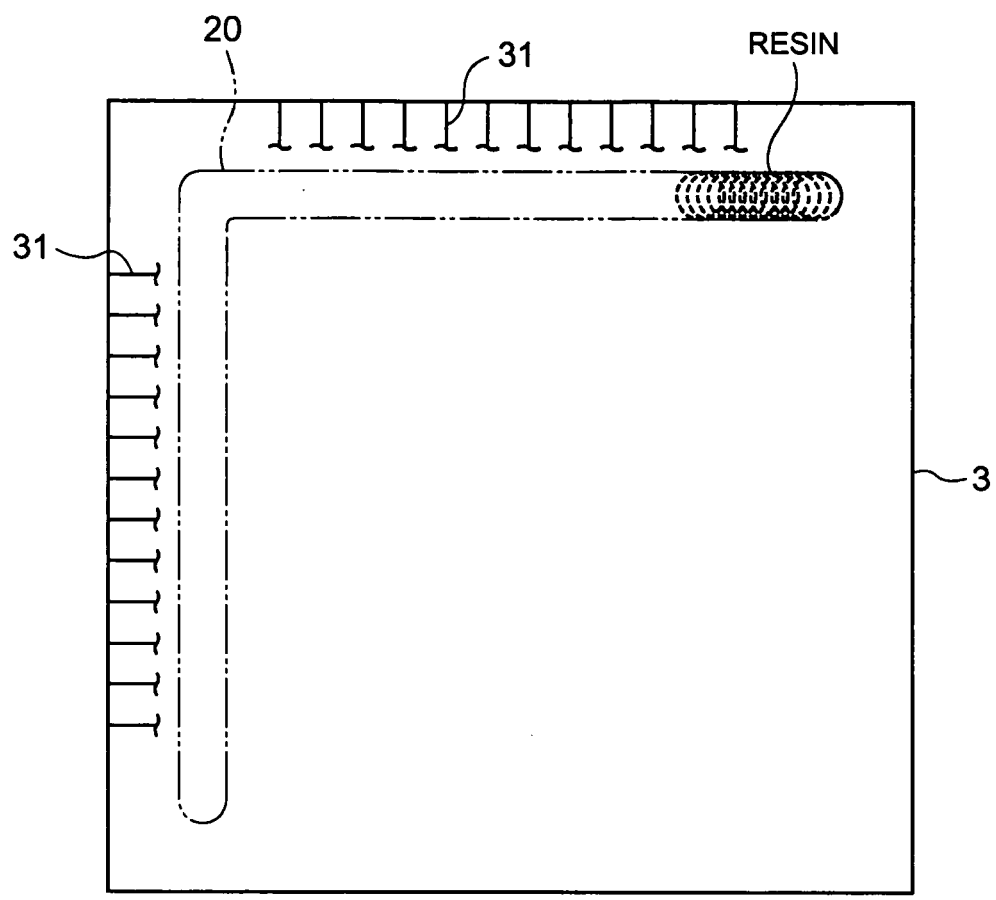
FIG. 10 is a schematic showing a method of manufacturing the electrophoretic display in the third exemplary embodiment of the present invention.

FIG. 10 is a schematic of a method of manufacturing the electrophoretic display 200 of the third exemplary embodiment. As shown in the schematic, the insulating material 20 of the electrophoretic display 200 of the third exemplary embodiment is formed by the following manner. A vinyl resin or an acrylic resin may be discharged and disposed on the leads 31 on the substrate 3 with, for example, an inkjet device that discharges and disposes a resin by means of a droplet discharge method. Then, the resin may be cured. Here, on the substrate 3, the pixel electrode 7*a*, the TFT element 7*b*, the data lines 70*a*, the scanning lines 71*a* and the leads 31 are formed. Consequently, after curing the resin that has been discharged and disposed on the leads 31, the electrophoretic display 200 of the exemplary embodiment can be manufactured by bonding the electrophoretic sheet 2 and the substrate 3.

Thus, the insulating part may be disposed on the substrate 3 by discharging and disposing an insulating material by a droplet discharge method. While the insulating part may be disposed on the substrate 3, for example, by a CVD method or the like, for example, in the case where the substrate 3 is formed with the material having a low heat resistance, in this exemplary embodiment, the insulating part may be disposed by the droplet discharge method that can dispose the insulating part in a lower temperature atmosphere in comparison to the CVD method.

Also, in the third exemplary embodiment, the insulating element 20 may be disposed at the position that corresponds to the entire periphery of the common electrode 22.

Fourth Exemplary Embodiment

Figure 12:
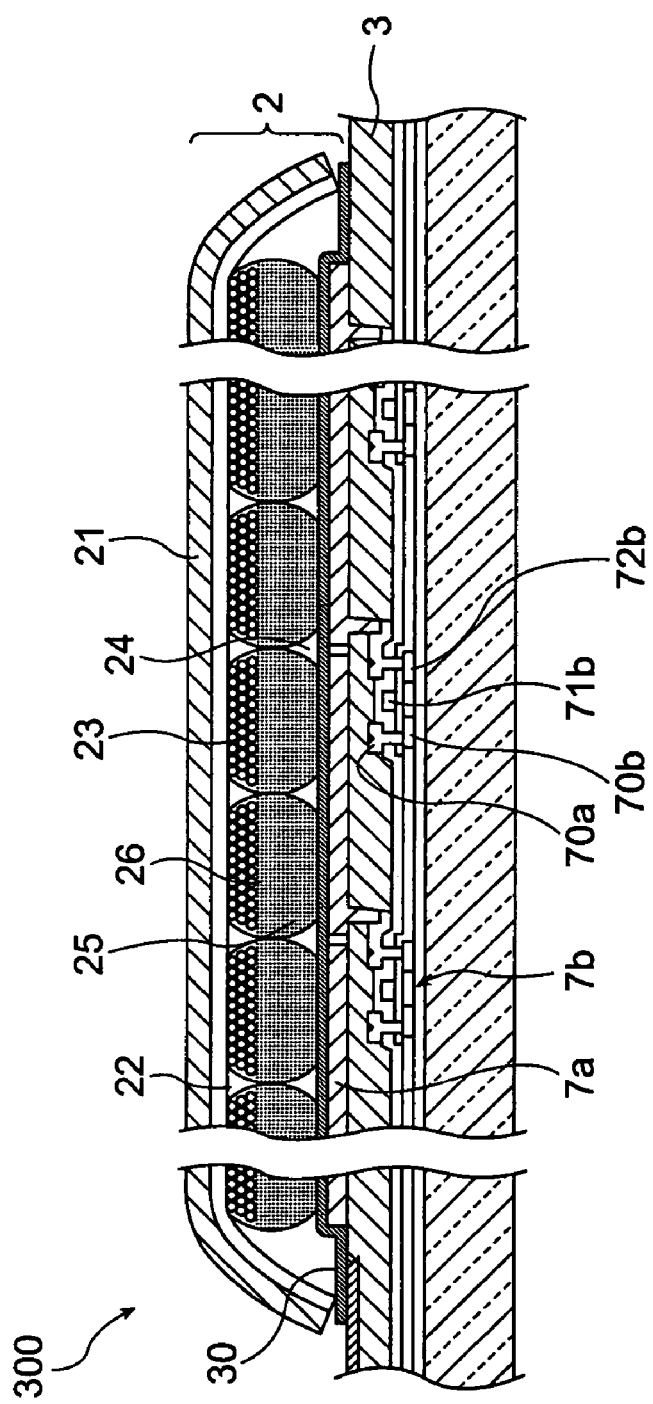
FIG. 12 is a sectional schematic showing the electrophoretic display in the fourth exemplary embodiment of the present invention.
Figure 13A:
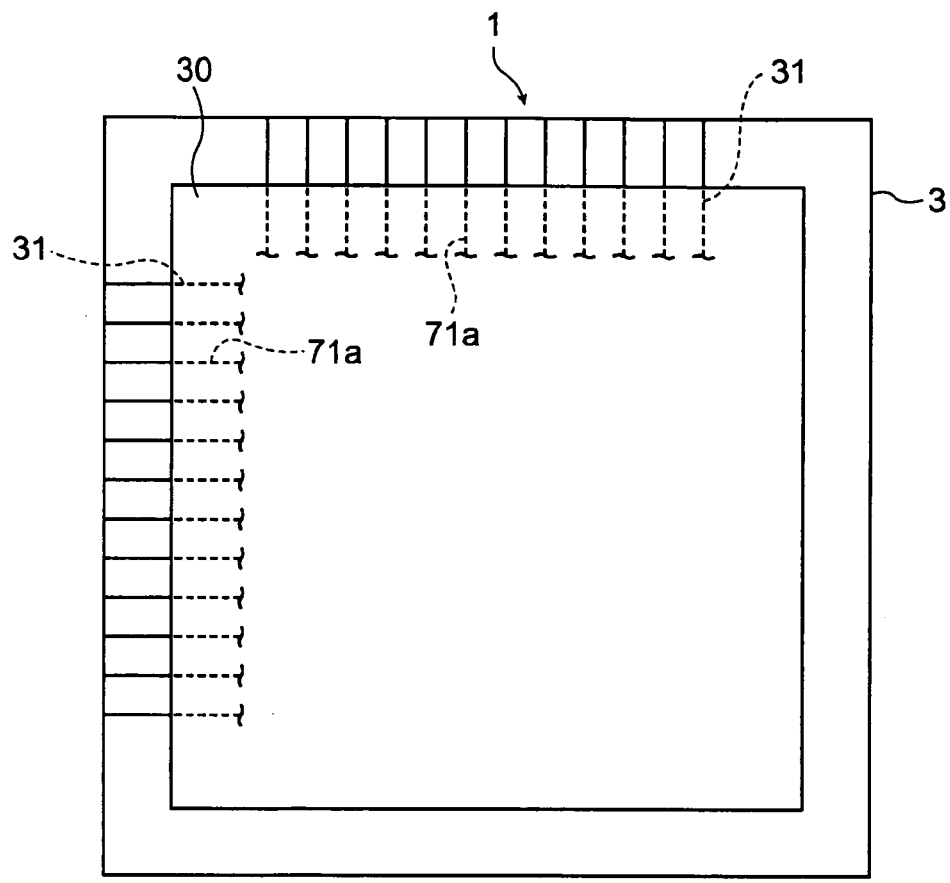
FIGS. 13A-13B are schematics showing a method of manufacturing the electrophoretic display in the fourth exemplary embodiment of the present invention.
Figure 13B:
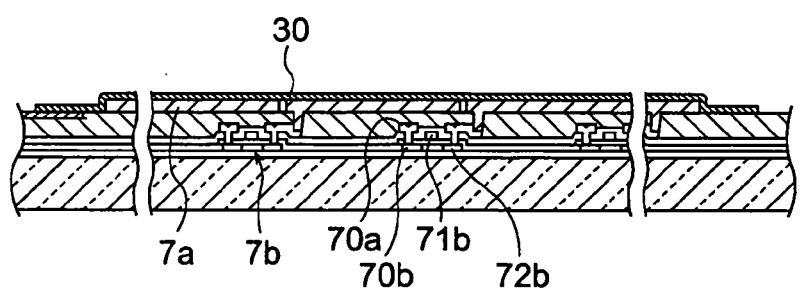

Next, an electrophoretic display 300 of a fourth exemplary embodiment and a method of manufacturing the same will be described referring to FIGS. 11 through 13B. In the description of the present fourth exemplary embodiment, the description of the same parts as those in the first exemplary embodiment will be omitted or simplified. FIG. 13A is a sectional view schematic, and FIG. 13B is a plan view schematic.

Figure 11:
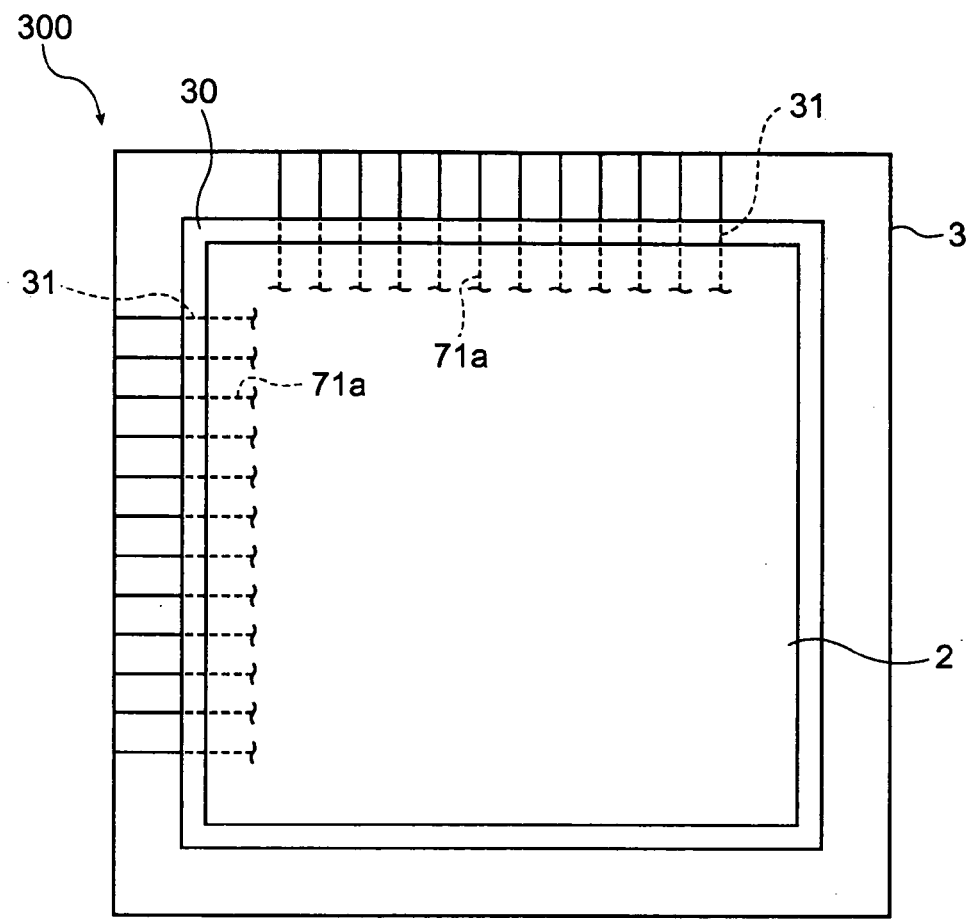
FIG. 11 is a plan schematic showing an electrophoretic display in a fourth exemplary embodiment of the present invention.

FIG. 11 is a plan view schematic of the electrophoretic display 300 of the fourth exemplary embodiment. FIG. 12 is a sectional view schematic of the electrophoretic display 300. As shown in FIG. 11 and FIG. 12, the electrophoretic display 300 of the fourth exemplary embodiment may have the configuration in which the electrophoretic sheet 2 and the substrate 3 are bonded with a protection sheet 30 (protection film).

The protection sheet 30 is the film that restrains substances such as organic solvent or the like that deteriorates the organic transistor from penetrating to the substrate 3 from the electrophoretic sheet 2. This makes it possible to prevent or discourage the organic transistor from being deteriorated.

In addition, in this exemplary embodiment, the protection sheet 30 is film like having a thickness from about 3 μm to about 50 μm. In this way, the protection sheet 30 having a thickness from about 3 μm to about 50 μm can reduce or prevent the application of an electric field to the display part 3 from being reduced or suppressed by the protection sheet 30.

In the fourth exemplary embodiment, the protection sheet 30 is disposed wider than the projected region, namely, the disposed region, of the electrophoretic sheet 2, if the electrophoretic sheet 2 is projected to the substrate 3. In this way, by disposing the protection sheet 30 wider than the disposed region of the electrophoretic sheet 2, the common electrode 22 of the electrophoretic sheet 2 can be discouraged or prevented from being touched to the leads 31 to be shorted.

In the electrophoretic display 300 of the fourth exemplary embodiment, the organic transistor included in the TFT element 7b can be discouraged or prevented from being deteriorated because the electrophoretic sheet 2 and the substrate 3 are bonded with the protection sheet 30.

Next, a method of manufacturing the electrophoretic display 300 of the fourth exemplary embodiment will now be described. First, similar to the first exemplary embodiment, the substrate 3 may be prepared such that the pixel electrode 7a, the TFT element 7b, the data lines 70a, the scanning lines 71a and the leads 31 are formed.

Subsequently, as shown in FIGS. 13A and 13B, the protection sheet 30 may be disposed on the substrate 3, the protection sheet 30 having wider area than the disposed region of the electrophoretic sheet 2 on the substrate 3. Then, the electrophoretic sheet 2 and the substrate 3 may be bonded to each other. Here, while the electrophoretic sheet 2 may be disposed to the electrophoretic sheet 2 side, in an exemplary embodiment, the electrophoretic sheet 2 is disposed on the substrate 3 having a wide substantially planar region. Thus, where the protection sheet having a thickness of 0.05 mm or lower is used, the sheet is easily broken and thus difficult to handle.

The electrophoretic display 300 in which the protection sheet 30 is disposed between the electrophoretic sheet 2 and the substrate 3 to reduce or prevent the organic transistor from being deteriorated can be manufactured by the method of manufacturing an electrophoretic display of the fourth exemplary embodiment.

Fifth Exemplary Embodiment

Next, an electrophoretic display 400 of a fifth exemplary embodiment and a method of manufacturing the same will be described referring to FIGS. 14 through 16. In the description of the present fifth exemplary embodiment, the description of the same parts as those in the fourth exemplary embodiment will be omitted or simplified.

Figure 14:
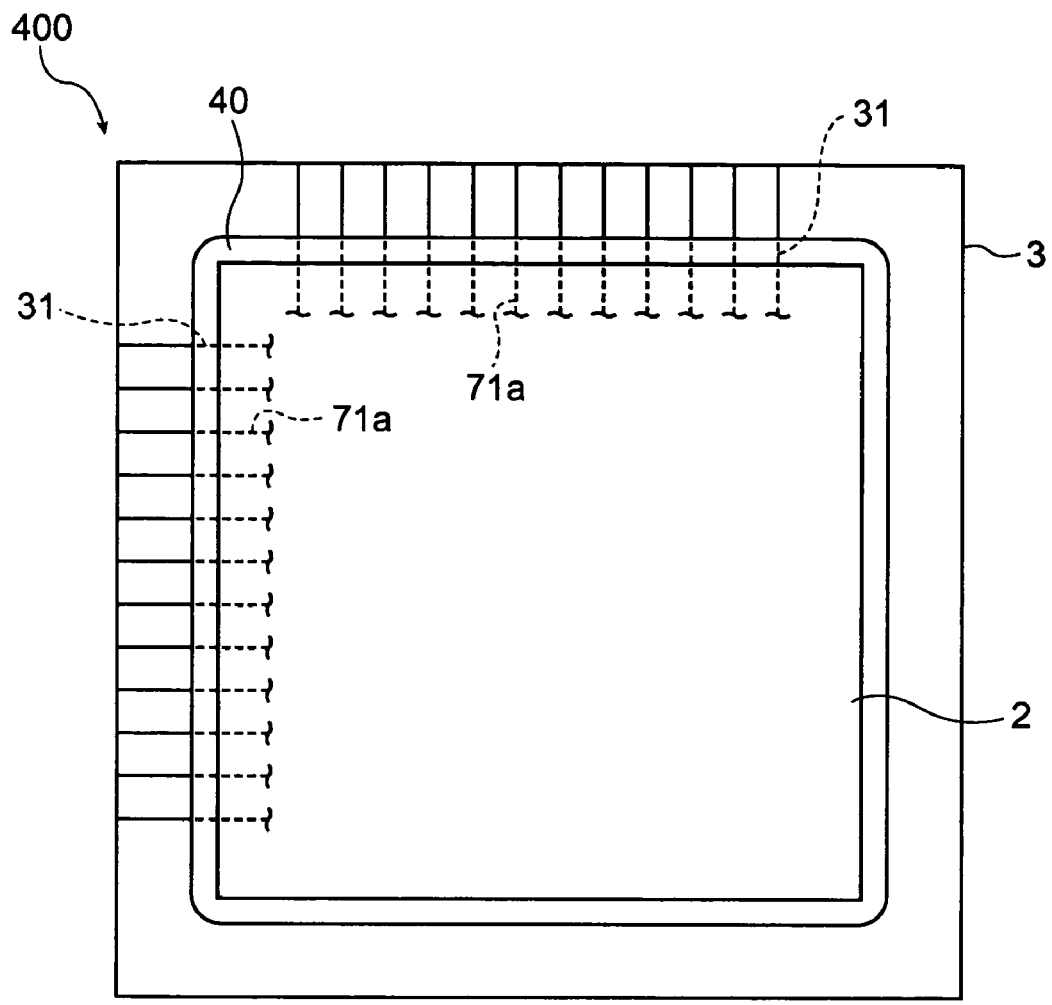
FIG. 14 is a plan schematic showing an electrophoretic display in a fifth exemplary embodiment of the present invention.
Figure 15:
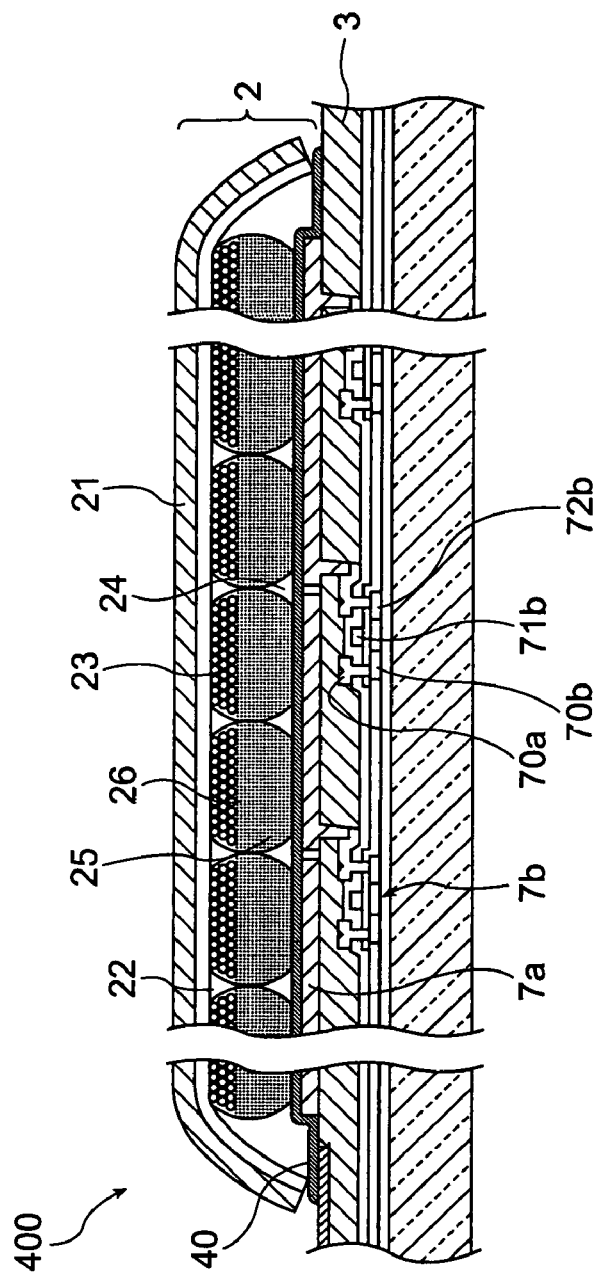
FIG. 15 is a sectional schematic showing the electrophoretic display of the fifth exemplary embodiment of the present invention.

FIG. 14 is a plan view schematic of the electrophoretic display 400 of the fifth exemplary embodiment. FIG. 15 is a sectional schematic of the electrophoretic display 400. As shown in these figures, in the electrophoretic display 400 of the fifth exemplary embodiment, a protection material 40 (protection film) made of a high-molecular-weight film may be disposed instead of the protection film 30 described in the above-described fourth exemplary embodiment.

Figure 16:
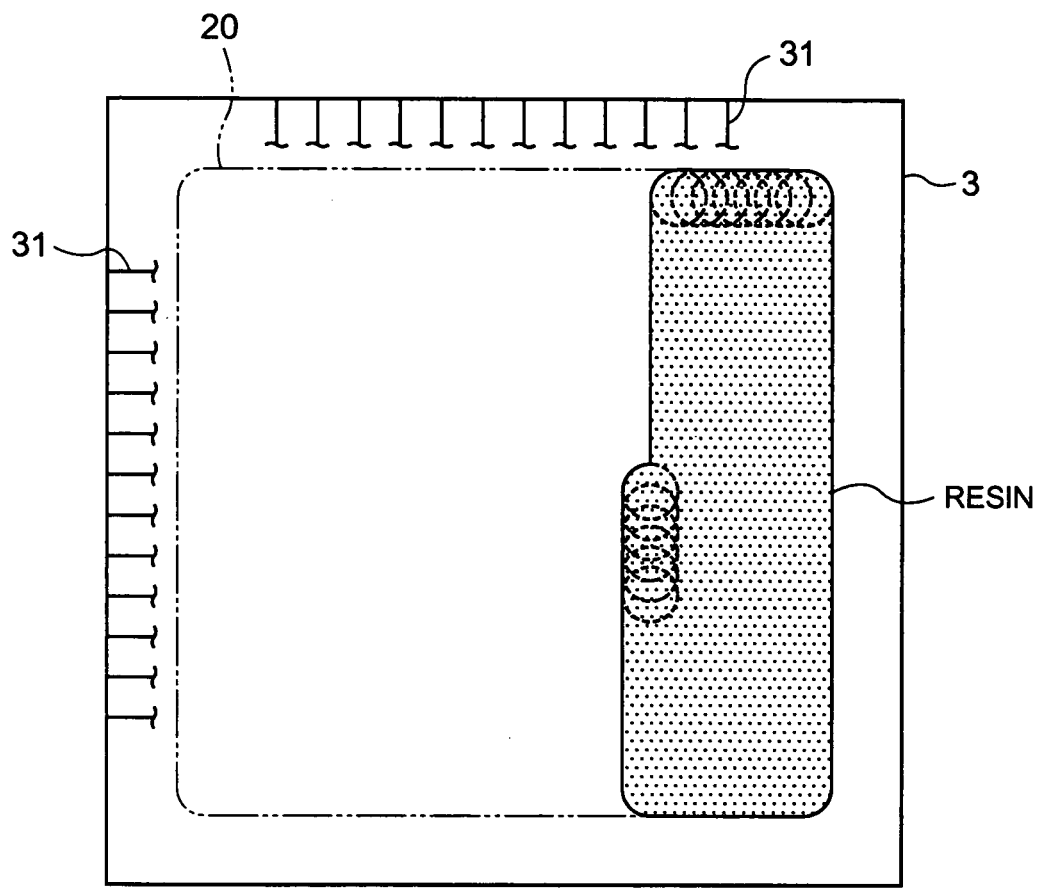
FIG. 16 is a schematic showing a method of manufacturing the electrophoretic display in the fifth exemplary embodiment of the present invention.

FIG. 16 is a schematic of a method of manufacturing the electrophoretic display 400 of the fifth exemplary embodiment. As shown in the schematic, the protection material 40 of the electrophoretic display 400 of the fifth exemplary embodiment is formed by the following manner. A vinyl resin or an acrylic resin may be discharged and disposed on a wider region than the disposed region of the electrophoretic sheet 2 on the substrate 3 with, for example, an inkjet device that discharges and disposes a resin by a droplet discharge method. Then, the resin may be cured. Here, on the substrate 3, the pixel electrode 7a, the TFT element 7b, the data lines 70a, the scanning lines 71a and the leads 31 are formed. Consequently, after curing the resin that has been discharged and disposed, the electrophoretic display 400 of this exemplary embodiment can be manufactured by bonding the electrophoretic sheet 2 and the substrate 3. In this way, the protection film may be disposed on the substrate 3 by discharging and disposing a protection material by a droplet discharge method.

Next, in exemplary embodiments, examples of electronic apparatuses including the above-described electrophoretic display will now be described with reference to FIGS. 17 through 20.

Figure 17:
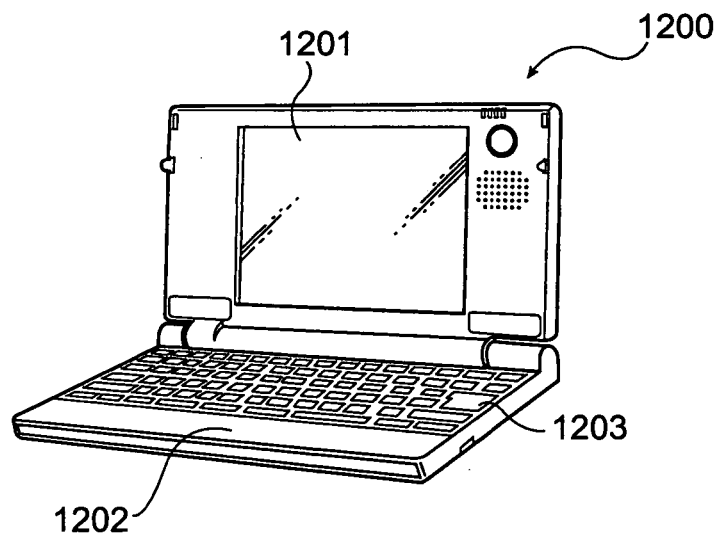
FIG. 17 is a schematic showing an example of electronic apparatus including the electrophoretic display in an exemplary embodiment of the present invention.

FIG. 17 is a perspective schematic showing the structure of a mobile (portable) personal computer. A personal computer 1200 has the electrophoretic display of the exemplary embodiments as a display 1201. The personal computer 1200 also has a body 1202 including a keyboard 1203.

Figure 18:
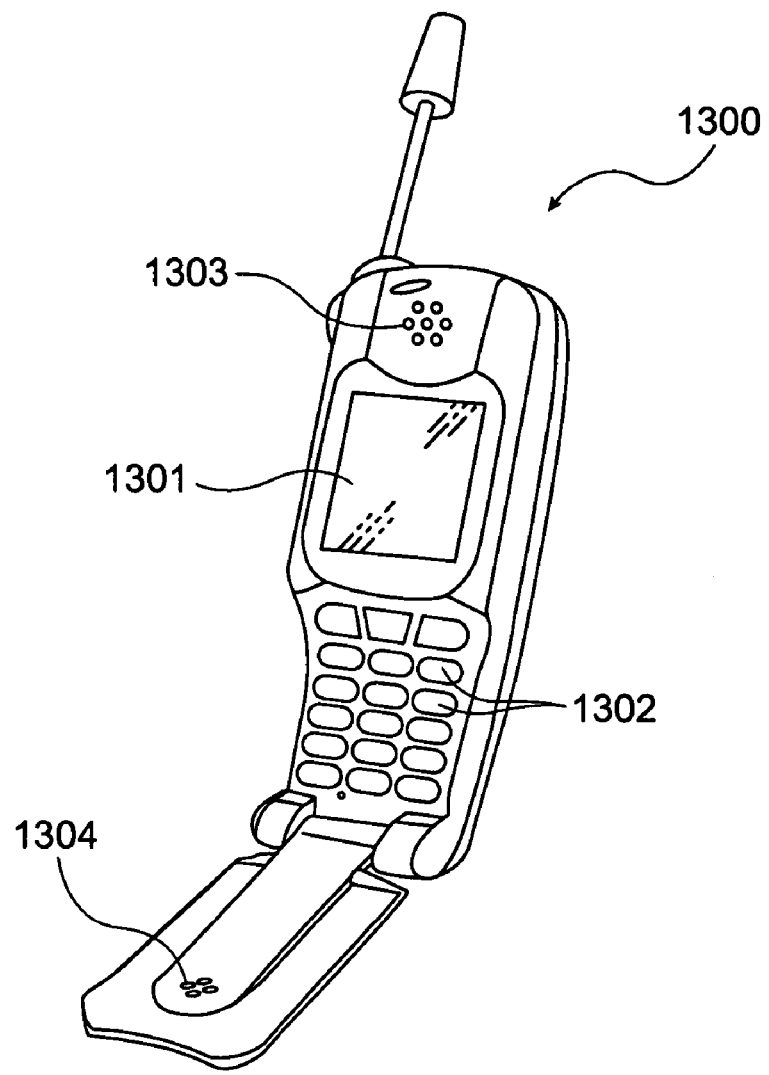
FIG. 18 is a schematic showing an example of electronic apparatus including the electrophoretic display in an exemplary embodiment of the present invention.

FIG. 18 is a perspective schematic showing the structure of a cellular phone. A cellular phone 1300 has the electrophoretic display of the exemplary embodiments as a small size display 1301. The cellular phone 1300 has a plurality of operation buttons 1302, an earpiece 1303 and a mouthpiece 1304.

Figure 19:
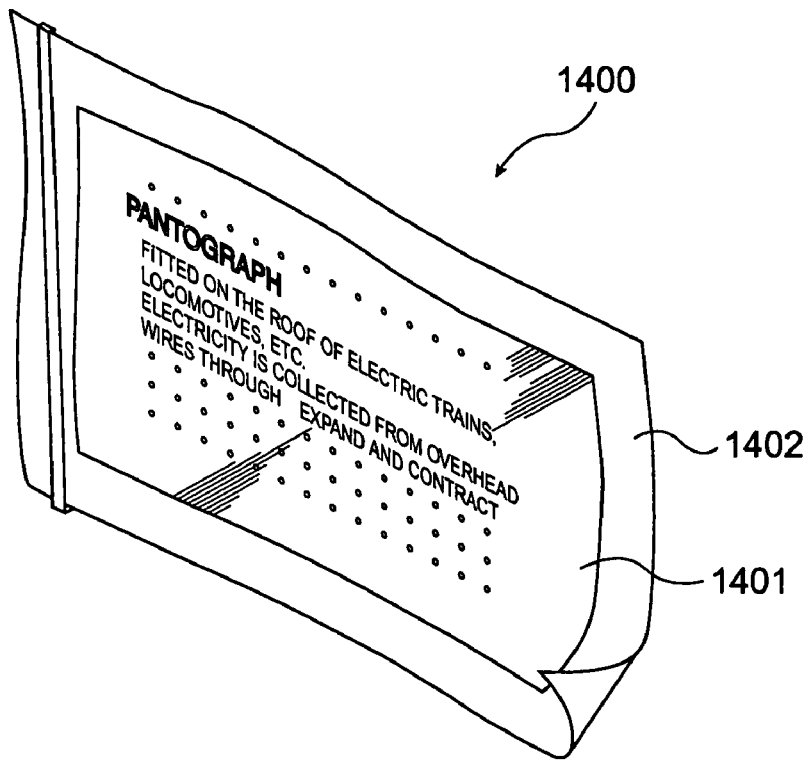
FIG. 19 is a schematic showing an example of electronic apparatus including the electrophoretic display in an exemplary embodiment of the present invention.

FIG. 19 is a perspective schematic showing the structure of an electronic paper. An electronic paper 1400 has the electrophoretic display of the exemplary embodiments as a display 1401. The electronic paper 1400 has a body 1402 formed of a rewritable sheet that has the same texture and flexibility as those of a paper.

Figure 20:
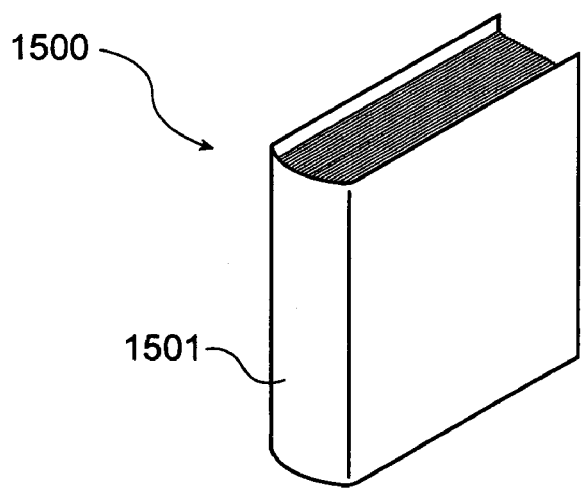
FIG. 20 is a schematic showing an example of electronic apparatus including the electrophoretic display in an exemplary embodiment of the present invention.

FIG. 20 is a perspective schematic showing the structure of an electronic notebook. An electronic notebook 1500 may be formed by bundling a plurality of electronic papers 1400 shown in FIG. 19 and sandwiching the electronic papers 1400 with a cover 1501. The cover 1501 has a display data input device (not shown) that inputs display data sent from an external device, for example. Accordingly, the displayed content can be changed and renewed in response to the display data while the electronic papers are still bundled.

In addition to the exemplary examples described above, liquid crystal televisions, video tape recorders of view finder types or monitor viewing types, car navigation devices, pagers, personal digital assistants, electric calculators, word processors, work stations, picture phones, POS terminals, apparatuses equipped with a touch panel and so forth can be cited as further examples thereof. An electrophoretic display manufactured by the method of manufacturing an electrophoretic display according to the exemplary embodiments can also be applied to a display of such an electronic apparatus.

Although exemplary embodiments of an electrophoretic display and a method of manufacturing the same are explained referring to the attached schematics, needless to say, the exemplary embodiments are not limited to these examples. In the above-described exemplary embodiments, the shapes, the combinations or the like of the each described components are an example, and various modifications can be made based on design demand or the like without departing from the scope and spirit of the exemplary embodiments.

For example, in the first exemplary embodiment through the third exemplary embodiment, the insulating part (insulating tape 10 or insulating material 20) may be disposed on the substrate 3. Then, the substrate 3 and the electrophoretic sheet 2 may be bonded to each other. However, the method of manufacturing an electrophoretic display according to the exemplary embodiments is not limited to these steps. For example, after disposing the insulating part at the edge part of the common electrode 22 in the electrophoretic sheet 2, the substrate 3 and the electrophoretic sheet 2 may be bonded to each other.

Also, in the first exemplary embodiment through the third exemplary embodiment, the TFT element 7*b* may include the organic transistor. However, in the electrophoretic displays 1, 100, and 200 in the first exemplary embodiment through the third exemplary embodiment, the TFT element 7*b* may only include an inorganic transistor without the organic transistor.

Also, in the fourth exemplary embodiment and the fifth exemplary embodiment, the protection film (protection sheet 30 or protection material 40) may be disposed on the substrate 3. Then, the substrate 3 and the electrophoretic sheet 2 may be bonded to each other. However, the method of manufacturing an electrophoretic display according to the exemplary embodiments is not limited to these features. For example, after disposing the protection film to the electrophoretic sheet 2, the substrate 3 and the electrophoretic sheet 2 may be bonded to each other.

In addition, in the first exemplary embodiment through the fifth exemplary embodiment, the electrophoretic displays 1, 100, 200, 300, and 400 are described as the electrophoretic display that can display black and white presentation with the display part 23 including the microcapsule 24, the dispersion liquid 25, and the white particles 26. However, the exemplary embodiments are not limited to these features. The electrophoretic display may display colors. As the configuration of the display part of such electrophoretic display that can display colors, there are various kinds of configurations. Microcapsules filled with white particles and colored particles negatively charged, and filled with colored dispersion liquid are exemplified.

Further, in the first exemplary embodiment through the fifth exemplary, embodiment, while the microcapsule 31 is spherical, the microcapsule 31 need not always be spherical. For example, a substantially square-shaped microcapsule may be applicable.

What is claimed is:

1. An electrophoretic display, comprising:
a sheet having a first electrode;
a substrate having a second electrode, a third electrode and an insulating part, the insulating part being in direct contact with both the first electrode and the third electrode in order to insulate the first electrode from the third electrode, and at least one lateral end of the first electrode having a bent portion to enable the first electrode to be in direct contact with the insulating part; and
a display part positioned between the first electrode and the second electrode, the display part including particles, the particles being configured to be moved by an electric field between the first electrode and the second electrode,
the first electrode including a first lateral edge and a second lateral edge, the first lateral edge being disposed on the insulating part and the second lateral edge being disposed on the substrate.

2. The electrophoretic display according to claim 1, the third electrode being a metal wiring.

3. The electrophoretic display according to claim 1, the insulating part surrounding the second electrode.

4. The electrophoretic display according to claim 1, the insulating part being an adhesive tape.

5. The electrophoretic display according to claim 4, the adhesive tape having two sides and the two sides of the adhesive tape having an adhesive property.

6. The electrophoretic display according to claim 1, the insulating part being made of a high-molecular-weight film having a thickness from about 3 μm to 150 μm.

7. The electrophoretic display according to claim 1, the insulating part covering the second electrode.

8. The electrophoretic display according to claim 1, the sheet having flexibility.

9. The electrophoretic display according to claim 1, the display part including a plurality of microcapsules, each of the plurality of microcapsules including the particles.

10. The electrophoretic display according to claim 1, the substrate having an organic transistor which is electrically connected to the second electrode.

11. The electrophoretic display according to claim 1, only a corner of the first electrode being in direct contact with the insulating part, the corner being a portion of the first lateral edge.

12. The electrophoretic display according to claim 1, a distance between the display part and the insulating part being greater than a distance between the display part and the third electrode.

13. The electrophoretic display according to claim 1, the insulating part being apart from the second electrode.

14. The electrophoretic display according to claim 1, the insulating part being a protection sheet.

15. An electrophoretic display, comprising:
a sheet having a common electrode;
a substrate having a plurality of pixel electrodes, a plurality of first wirings, a plurality of second wirings and an insulating part, the insulating part being in direct contact with the common electrode and the plurality of first wirings in order to insulate the common electrode from the plurality of first wirings, and at least one lateral end of the common electrode having a bent portion to enable the common electrode to be in direct contact with the insulating part; and a display part positioned between the common electrode and the plurality of pixel electrodes, the display part including particles, the particles being configured to be moved by an electric field between the common electrode and the plurality of pixel electrodes, the common electrode including a first lateral edge and a second lateral edge, the first lateral edge being disposed on the insulating part and the second lateral edge being disposed on the substrate.

16. The electrophoretic display according to claim 15, the substrate having four sides, the plurality of first wirings being positioned between a first side of the four sides and the plurality of pixel electrodes, the plurality of second wirings being positioned between a second side of the four sides and the plurality of pixel electrodes.

17. The electrophoretic display according to claim 16, the insulating part being positioned between the first side of the four sides of the substrate and the plurality of pixel electrodes and between the second side of the four sides of the substrate and the plurality of pixel electrodes.

18. The electrophoretic display according to claim 15, the insulating part being in direct contact with the common electrode and the plurality of second wirings in order to insulate the common electrode from the plurality of second wirings.

19. A method of manufacturing an electrophoretic display that includes a sheet having a first electrode; a substrate having a second electrode, a third electrode and an insulating part; and a display part including particles, the particles being configured to be moved by an electric field between the first electrode and the second electrode, the method comprising:

disposing the display part on the substrate so that the display part is positioned between the first electrode and the second electrode; and pressing the sheet to the substrate so that the display part is pressed to the second substrate, the insulating part being in direct contact with both the first electrode and the third electrode by the process of pressing so that the insulating part insulates the first electrode from the third electrode, and at least one lateral end of the first electrode having a bent portion to enable the first electrode to be in direct contact with the insulating part, the first electrode including a first lateral edge and a second lateral edge, the first lateral edge being disposed on the insulating part and the second lateral edge being disposed on the substrate.

20. The method of manufacturing an electrophoretic display according to claim 19, further comprising:

bonding the substrate and the electrophoretic display part to each other, after disposing the insulating part to the substrate.

21. The method of manufacturing an electrophoretic display according to claim 19, the insulating part being disposed by a droplet discharge method.

* * * * *